No. 837,948. PATENTED DEC. 11, 1906.
A. A. McINTOSH.
RELEASING BLOCK OR HOOK.
APPLICATION FILED MAR. 28, 1906.
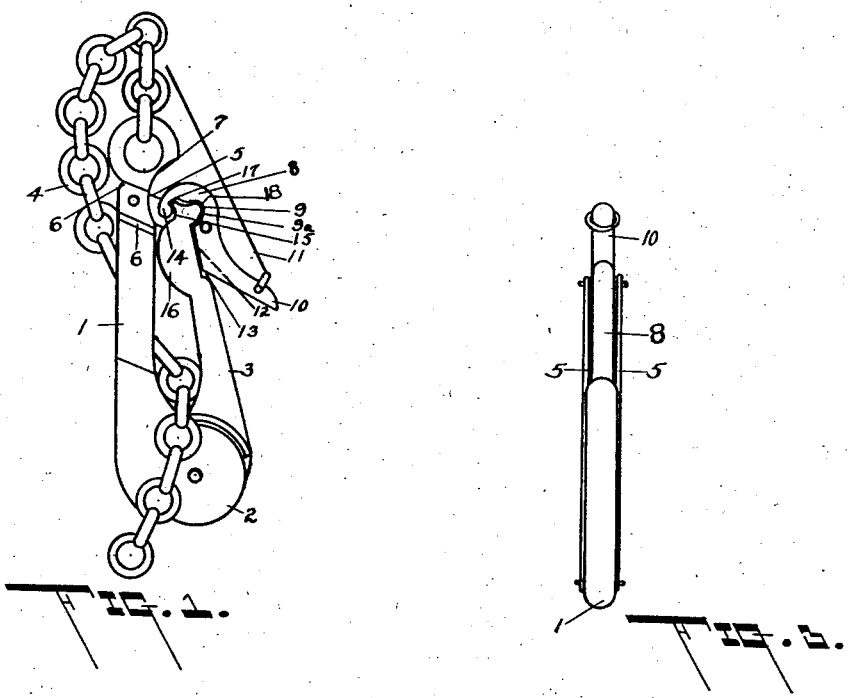
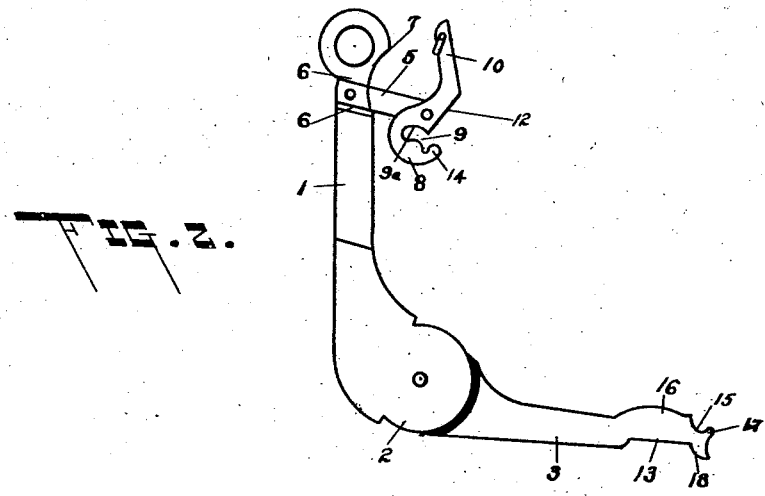
WITNESSES: INVENTOR
Angus A. McIntosh
BY
Geo. B. Willcox ATTORNEY

UNITED STATES PATENT OFFICE.

ANGUS A. McINTOSH, OF ALEXANDRIA, ONTARIO, CANADA.

RELEASING BLOCK OR HOOK.

No. 837,948.　　　　Specification of Letters Patent.　　　Patented Dec. 11, 1906.

Application filed March 28, 1906. Serial No. 308,519.

*To all whom it may concern:*

Be it known that I, ANGUS A. McINTOSH, a subject of the King of Great Britain, residing at Alexandria, in the county of Glengarry and Province of Ontario, Canada, have invented certain new and useful Improvements in Releasing Blocks or Hooks; and I do hereby declare the following to be a full, clear, and exact description of the invention, such as will enable others skilled in the art to which it appertains to make and use the same.

My invention relates to releasing hooks or blocks, one embodiment of which I have chosen to illustrate in this application.

An object of my invention is the provision of a suitable draft-block capable of being easily and quickly secured in locked position or released to assume an unlocked position.

A further purpose is to provide a device capable of use as a grab-hook for hauling, loading, or binding logs or other material, which is highly efficient in operation, simple, compact, durable, and the parts of which may be easily replaced when necessary.

Another object is the provision of a device of this character which can be locked in any position which it is capable of assuming while in use.

My invention further consists in certain novel features and combinations of parts or their equivalents, one embodiment of which is shown in the accompanying drawings, in which—

Figure 1 is a side view of my invention in locked position, a link being removed to better disclose the construction. Fig. 2 is a side view showing the device in its unlocked position, and Fig. 3 is a top plan view.

As shown in the drawings, the device preferably comprises a shank 1, having its lower end thickened slightly, as at 2, and curved outwardly to afford sufficient strength to withstand strain and to permit one end of the member 3 to be pivotally secured thereto by means of a rule-hinge or joint connection of any convenient form, such joint limiting the swinging movement of the member relative to the shank. The opposite end of the shank is provided with an aperture for the attachment of a flexible connection 4—as, for instance, a chain.

Located, it may be, adjacent the aperture and opposite the hinged end of the shank are a pair of links 5 5, each of which is pivotally secured at one end to the shank, which latter is provided with the inclined shoulders 6 6 on each side of the links to limit their movement relative thereto, the inner face of the shank being preferably cut away, as at 7, to give clearance to the head 8 of a latch mounted between the outer ends of the links 5 5. The head of the latch or trip is preferably circular to conform to the cut-away or recessed portion 7 on the shank adjacent the pivotal point of the link and shank, said head having an irregular approximately heart-shaped recess 9 formed therein at a point extending above a line drawn between the pivotal point of the links and shank and the pivotal point of the head and links, or so that the end of the member 3 received in the recess will lie practically in alinement with the ends of the links when the device is in closed or locked position.

The tail 10 of the latch extends outwardly from the head and member when the device is in closed or locked position and is provided with means for attaching a tripping-cord 11 thereto, the offset tail affording sufficient leverage to move the latch and the links on the free end of the member as a pivot until past the dead-center or out of alinement therewith, whereupon the free end of the member is released.

Intermediate the head and tail the latch is faced, as at 12, to lie and be received in a recess 13, similar in conformation to the face 12, such recess being formed in the outer side of the member to permit the latch to lie closely against it and substantially parallel with the pivoted member.

The head of the latch is provided with a tooth 14, located on one wall of the recess 9 and lying in a recess 15, formed in the inner side of the pivoted member 3 adjacent the end of the pivoted member, below which recess is formed an enlargement 16, practically closing the throat of the device, the chain or other connection being received in the space formed between the enlargement and the joint connection between the shank and pivoted member. The free end of the member conforms in shape to the recess 9 of the latch, in which it is snugly received.

When in the closed position, (shown in Fig. 1,) the toe 17 at the free end of the member engages or takes behind the tooth 14 of the head and forms a pivot-point around which the latch moves in releasing the pivoted member.

In operation, the hook being in open position and it being desired to close the same, all that is necessary is to close the pivoted member 3 on the shank, the free end of the member being received in the heart-shaped recess in the head of the latch, the outer curved face 18 of the free end of the member forming a continuation of one side 9ª of the recess, the toe 17 of the member taking behind the tooth 14 of the head of the latch, which tooth lies in the indentation 15 on the inner edge of the pivoted member, while the periphery of the head of the latch is received in the space formed by the cut-away portion of the shank. The latch is now thrown down, thereby bringing its pivotal point below the pivotal point of the links and the free end of the member 3, the links lying in an inclined position and the faced edge of the latch lying in the recess formed therefor on the outer edge of the pivoted member, the latch operating to hold and lock the pivoted member against movement, the links resting on the inclined shoulders formed therefor and the links of a chain or other connection (not shown) being held in the restricted space between the shank and member. To unlock the device, the tripping connection is pulled smartly, whereupon the latch is raised until the curved face 18 at the free end of the pivoted member clears the recess 9, the tooth 14 engaging the end of the member to force the latter outward as the latch is raised, the links moving with the latch away from the free end of the pivoted member until at the moment the curved face clears the recess 9 the tooth 14 will have urged the member so that it lies beyond the vertical center of its joint with the shank, whereupon the tension of the load will snap the member open to release the load. The tension or weight of the load is always tending to open the hook, such tension being brought to bear by the curved face 9ª on the head of the latch at a point to one side of the ends of the links, and it will be noted that the pivoted member inclines toward the shank when in locked position.

It is evident that my device may be utilized in a plurality of ways, such as serving as a binder to unite the ends of a chain or in other ways, and it is also obvious that many changes might be made in the forms and arrangements of the several parts described without departing from the spirit and scope of my invention, and hence I do not wish to limit myself to the exact construction herein set forth.

Having thus fully disclosed my invention, what I claim as new, and desire to secure, is—

1. A releasing-hook comprising a rigid shank, offset at one end, a rigid member pivotally connected to the offset end, a latch at the opposite end of the shank, for engaging the free end of the member to retain the hook in locked position, the member when in locked position being inclined relative to the shank and having its free end lying past dead-center and nearer the shank than the pivotal point of the member and shank.

2. A device comprising a shank, a member pivotally connected thereto and capable of movement toward and from the shank, means for connecting the free end of the member and the shank to leave a space therebetween and an enlargement on the member near its free end for closing the throat of said space.

3. A device comprising a shank, a member pivotally secured at one end thereto, links pivotally secured to the shank, shoulders for limiting the movement of the links and a latch pivotally mounted between the links and adapted to engage and lock the free end of the member in closed position.

4. A device comprising a plurality of members pivotally connected at one end, links pivotally secured to one of the members and adapted to embrace the remaining member and a latch pivotally mounted between the links and adapted to engage the free end of the member to lock the member in closed position.

5. A device comprising a shank recessed at one edge, a member pivotally secured to the shank, a latch, the outer periphery of the head of which is adapted to be received and turn in the recess, the latch adapted to retain the member in closed position and means for pivotally connecting the latch and shank.

6. A device comprising a shank, a member pivotally secured thereto, a latch suitably connected to the shank, for locking the pivoted member in closed position, the member provided with a recess at its free end and a tooth on the latch adapted to take into the recess to throw the pivoted member outward as the device is unlocked.

7. A device comprising a shank, a member pivotally secured thereto, a latch suitably connected to the shank and having a recess formed therein to receive the free end of the member and a tooth on the free end of the member adapted to engage one corner of the recess and forming a center about which the latch moves through a part of its path.

8. A device comprising a shank, a member, one end of which is pivotally secured thereto, a curved face located on the free end of the member and a latch pivotally connected to the shank and having a recess formed therein to receive the free end of the member, one wall of the recess being curved in conformity with the curved face to facilitate the entrance of the free end of the member into the recess.

9. A device comprising a shank, a member, one end of which is pivotally secured thereto, connecting means pivoted to the shank, a recessed latch pivotally secured to the connecting means and adapted to receive the free end of the member when in closed position, the latter lying out of alinement with the pivotal points of the latch and connecting means when in closed position.

10. A device comprising a shank, a member pivoted at one end thereto, links pivoted to the shank, a latch pivoted between the free ends of the links and adapted to lock the member in closed position, the free end of the member when in locked position extending out of alinement with the pivotal points of the links and latch.

11. A device comprising a shank, a member, one end of which is pivoted to the shank, the outer face of the member near its free end being recessed, a latch pivotally connected to the shank and adapted to engage and lock the member in closed position, a faced portion on the latch received in the recess in the member and a tail on the latch offset from the member and latch.

12. A releasing-hook comprising an offset shank, a member pivotally secured at one end to the offset, a recessed latch pivotally connected with the shank, the free end of the member receivable in the recess and adapted to be kicked by the rotation of the latch over dead-center in one direction or the other.

In testimony whereof I affix my signature in presence of two witnesses.

ANGUS A. McINTOSH.

Witnesses:
   AGNES H. BURKE,
   HORACE M. SANFORD.